UNITED STATES PATENT OFFICE.

FRANKLIN McCULLEY, OF McKINNEY, TEXAS.

IMPROVEMENT IN SOLUTIONS FOR PRESERVING MEATS.

Specification forming part of Letters Patent No. 201,811, dated March 26, 1878; application filed November 27, 1877.

*To all whom it may concern:*

Be it known that I, FRANKLIN McCULLEY, of McKinney, in the county of Collin and State of Texas, have invented certain new and useful Improvements in Compositions for Preserving Meat, &c., of which the following is a specification:

This invention relates to an improved composition of matter for preserving perishable articles of food, which I term the "Texas Meat-Preserving Process."

The invention is especially designed for the preservation of meats; and it consists in a composition of water, sugar, charcoal, saltpeter, and salt, thoroughly commingled, and applied as hereinafter more fully set forth.

In carrying out my invention, I employ the ingredients in about the following proportions, viz: Water, one gallon; white sugar, one-fourth pound; charcoal, one-eighth pound; saltpeter, two ounces; salt, three-fourths pound.

The soluble salts above mentioned are thoroughly dissolved in the water, and the charcoal in a well-burned and pulverized condition is added to the solution and thoroughly mixed with said solution, being held in suspension mechanically therein.

The compound is employed for the preservation of articles of food in the same manner as the ordinary pickle for preserving meats, and is poured over the same in a cold condition, care being taken that it shall thoroughly cover and permeate the same, and is left thereon until said articles are required for use; or the articles, after being thoroughly pickled, may be removed and smoked, or otherwise prepared, in the same manner as employed in curing meats as heretofore practiced.

The above-mentioned proportions I have found to answer well in practice; but the proportions may be varied considerably and good results still be obtained, and I therefore do not limit myself strictly to the proportions named.

What I claim as my invention is—

A composition of matter for preserving perishable articles of food, consisting of water, sugar, charcoal, saltpeter, and salt, in about the proportions herein set forth.

In testimony that I claim the foregoing I have hereunto set my hand in the presence of the subscribing witnesses.

FRANK. McCULLEY.

Witnesses:
W. W. MERRITT,
J. M. BURGE.